July 9, 1935.  W. H. FARR  2,007,892
VEHICLE WHEEL OR OTHER METALLIC STRUCTURE
AND METHOD OF MANUFACTURING THE SAME
Filed May 19, 1932
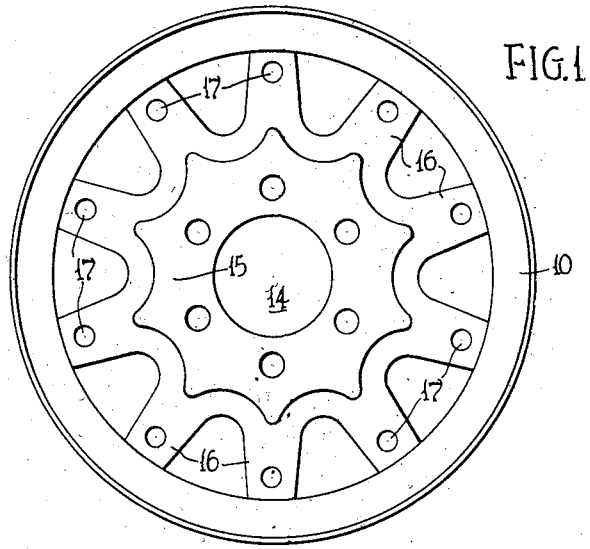
FIG.1
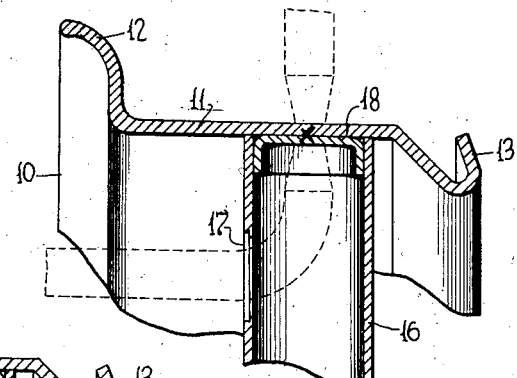
FIG.2
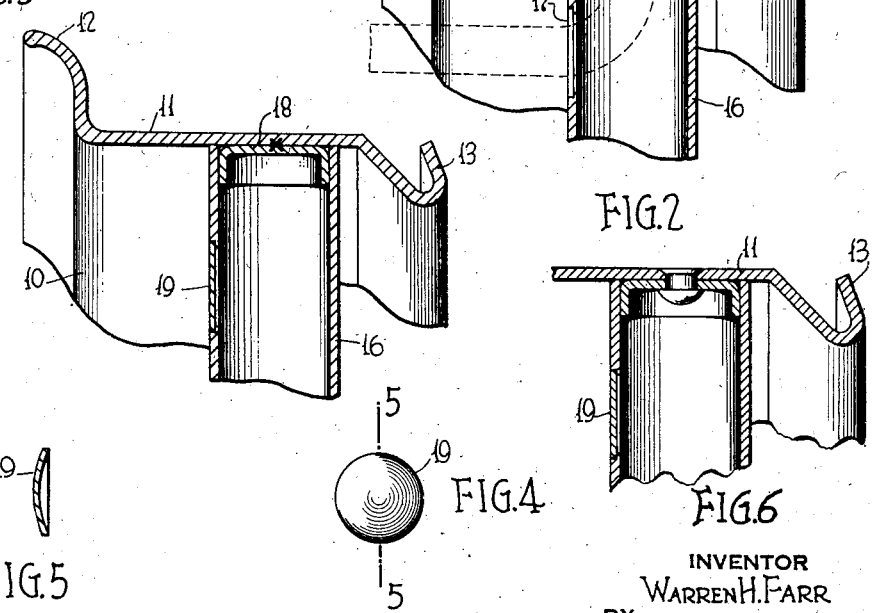
FIG.3
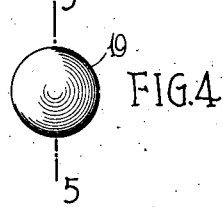
FIG.5
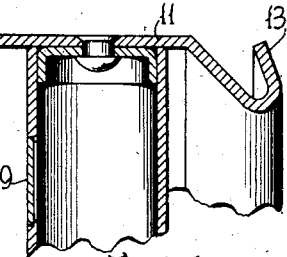
FIG.4
FIG.6
INVENTOR
Warren H. Farr
BY
John P. Tarbox
ATTORNEY Patented July 9, 1935

2,007,892

UNITED STATES PATENT OFFICE 2,007,892

VEHICLE WHEEL OR OTHER METALLIC STRUCTURE AND METHOD OF MANUFACTURING THE SAME

Warren H. Farr, Detroit, Mich., assignor to Budd Wheel Company, Philadelphia, Pa., a corporation of Pennsylvania Application May 19, 1932, Serial No. 612,182

5 Claims. (Cl. 219—10)

The invention relates to vehicle wheels and more particularly to an improved method for securing the ends of hollow artillery wheel spokes to a rim.

It has been a well known practice in recent years to form the spokes and wheel body of artillery wheels by welding together in a central middle plane a pair of complementally shaped opposed stampings. Such a wheel body has been found to be exceedingly strong without being excessive in weight, and is favored among car manufacturers and users throughout the industry. Such wheel bodies offer a rather difficult problem in that the interior of the spokes is not readily accessible, whereby to effect a securement between the end of each spoke to the rim, due partly to the fact that spokes are of considerable radial extent, and also due to the fact that the nave or center portion of the wheel body is often completely closed by inturned flanges. Many proposals have been directed in the past to the securement of closed spoke wheel bodies to rims, but substantially all of the methods of the prior art have been rather complicated and not generally adapted for use in production practices.

My invention has for its chief object the provision of a method whereby the ends of the respective spokes of a closed wheel body may be successfully secured to a rim, without either deforming the spokes, or without undue labor. A further object of the invention relates to a method of concealing certain portions of the wheel, in such a manner that the appearance thereof will not be affected. Other objects and advantages relate to detailed constructions, characterized by the utmost simplicity and utility.

Broadly, I achieve the objects of my invention by providing apertures in the respective spokes, through which securing tools such as electrodes, may be inserted to effect the securement between the spoke ends and the rim.

Other objects and advantages will be apparent from the reading of the sub-joined specifications in light of the attached drawing in which, Figure 1 is a rear elevation view of a sheet metal spoke wheel embodying my invention.

Figure 2 is a detailed sectional view through a rim and a portion of a spoke, showing the method of attaching these members.

Figure 3 is a view similar to Figure 2 showing the completely assembled spoke and rim.

Figure 4 is a plan view of a closure member or plug, used to conceal the aperture through which the securing tool is passed.

Figure 5 is a detailed sectional view taken on line 5—5 of Figure 4.

Figure 6 is a view similar to Figure 3, showing a modified form of my invention.

Referring now to the drawing by reference numerals, the usual vehicle wheel rim is indicated by numeral 10. This rim comprises a tire base portion 11, a tire retaining flange 12, and a gutter portion 13 for the reception of a locking ring, (not shown). The wheel, indicated generally by numeral 14 is comprised of a nave portion 15, and an annular series of equally spaced radially extending hollow spokes 16. The wheel body as a whole is made in accordance with the preferred method of forming two complementally shaped stampings, and thereafter welding these stampings together in the central plane thereof to form a hollow wheel body. In wheels formed in this manner the inner peripheral edge of the nave portion 15 is usually closed. The spokes formed in this way are integral with the nave portion 15 and are substantially tubular.

Inasmuch as the interior of the spokes is relatively inaccessible, except through the ends of the spokes themselves, I have provided means whereby I may insert the proper tools to effect a firm securement between the spoke ends and the rim, and thereafter so conceal these means that the appearance of the wheel is unaffected. It will be seen that even if the inner peripheral edge of the nave portion 15 of the wheel were left open it would, in the case of long spokes be rather difficult to insert a tool radially outwardly through each respective spoke in order to effect its securement to the rim.

According to a preferred form of the invention I provide an aperture 17 on the rear side of each spoke, adjacent the rim 10. This aperture is preferably annular, and the side walls thereof are of stepped cross section, the side walls adjacent the exterior of the spokes being inclined at a re-entrant angle. In the assembly of the wheel body with the rim, I first place a cup 18 in the end of each spoke and thereafter telescope the wheel body to the proper position with respect to the rim member 10, and preferably press fit it therewithin. After the two main members are in correct position, I insert a welding electrode through aperture 17 in each spoke 16, and spot weld the bottom of cup 18 to the rim. As shown in Figure 2, another electrode of opposite polarity is held against the outside of the rim adjacent the center of the cup. I prefer to secure the respective spokes of the wheel in progressive order. Spoke end cups 18 may be secured to rim 10 by rivets, as in Figure 6, an anvil instead of an electrode being inserted through aperture 17.

After each spoke is secured to the rim through its cup 18, the electrode is withdrawn and inserted in the next adjacent spoke, this operation being continued until all of the spokes are secured to the rim. After all of the spokes have been secured in this manner plugs 19, commercially known as Welch plugs, may be inserted in the stepped cross section apertures and expanded thereinto.

The method described above has been found to be entirely satisfactory for the assembly and securement of wheel bodies to rims. The provision of apertures 17 in the spokes 16 allows free access to the interiors thereof, whereby securing tools such as anvils or electrodes, may be inserted; and the provision of the metallic plugs 19 to conceal apertures 17 completely encloses the wheel body thus rendering it free from objection as to appearance. This feature also makes the wheel body water tight and precludes the entry of dirt. It will be apparent to those skilled in the art that I have devised an exceedingly simple yet efficient means for effecting the desired securement and that the invention is characterized by a substantial degree of novelty and utility.

I am aware that many modifications of my invention may be made without departing from the spirit thereof, and I do not wish to be limited to the circumstantial terminology of the specifications but rather solely by the scope of the appended claims.

What I claim is:

1. In the fabrication of artillery steel wheels or other metallic structures, the method of securing stamped tubular members of closed but hollow cross section to metal members extending across the ends of the tubular members by securing means local to the ends of the tubular members which consists in providing a securing tool admitting aperture in the side wall of the tubular member of such size and configuration that the securing tool may be projected within the hollow of the tubular member to the locale of the securing means at the end of the tubular member and there appropriately manipulated to effect the securement.

2. The method of securing a tubular spoke of an artillery wheel to a rim, which comprises providing an element in the outer end of the spoke for attaching the spoke to the rim, forming an opening in the spoke at a right angle thereto and a rabbet perimeter for the opening in the spoke wall at the rear of the wheel, the opening being of an area and distance from the outer spoke end admitting an angularly-bent electrode of sensible size to have a portion along the spoke therein against said element, welding the element to the rim, withdrawing the electrode, placing a cupped disc closely fitting the opening on the rabbet perimeter, and pressing the disc to radially expand its periphery into tight holding engagement with the frame and to have its outer surface in flush conformity to the adjacent rear surface of the spoke.

3. In the fabrication of artillery steel wheels the method of securing stamped wheel spokes of closed but hollow cross section to the metal rims by securing means local to the ends of the spokes which consists in providing a securing tool admitting aperture in the side wall of the spoke of such size and configuration that the securing tool may be projected within the hollow of the spoke to the locale of the securing means at the end of the spoke and there appropriately manipulated to effect the securement.

4. The method according to claim 3 in which after the securement the tool is removed and the opening closed.

5. A body stamping for artillery steel wheels comprising nave and spoke portions provided initially with openings in the side walls of the spoke portions adjacent the ends of said portions whereby when the stamping is fabricated into connection with the wheel rim, a securing tool may be projected interiorly of the spoke structures and there manipulated to effect the connection of the spoke ends with the rim.

WARREN H. FARR.